United States Patent [19]
Smith

[11] 3,947,728
[45] Mar. 30, 1976

[54] NETWORK PROTECTOR RELAY
[75] Inventor: David R. Smith, McKeesport, Pa.
[73] Assignee: Westinghouse Electric Corporation, Pittsburgh, Pa.
[22] Filed: May 23, 1974
[21] Appl. No.: 472,773

[52] U.S. Cl. .................. 317/47; 317/23; 317/27 R; 317/48
[51] Int. Cl. ......................... H02h 3/36; H02h 3/26
[58] Field of Search ...... 317/27 R, 47, 48, 23, 28 R; 307/232; 324/83 A, 83 D, 86; 328/133

[56] References Cited
UNITED STATES PATENTS

| | | | |
|---|---|---|---|
| 3,248,609 | 4/1966 | Gambale | 317/23 |
| 3,374,399 | 3/1968 | Dewey | 317/47 |
| 3,405,320 | 10/1968 | Schwanenflugel | 317/27 R |
| 3,532,935 | 10/1970 | Waldron | 317/23 |
| 3,736,470 | 5/1973 | Ford et al. | 317/47 X |

Primary Examiner—J. D. Miller
Assistant Examiner—Patrick R. Salce
Attorney, Agent, or Firm—D. R. Lackey

[57] ABSTRACT

A network protector relay having trip characteristics which respond not only to the direction of the flow of positive-sequence power through the breaker outwardly of the network but which will respond to unbalanced and simultaneous faults in the feeder network as well. The network protector relay in addition to its tripping characteristics includes closing characteristics which will permit the automatic closing of a breaker only when the phase sequence of the feeder is the same as that of the network, there is a proper phase relationship between the network and feeder and the magnitude of the feeder voltage is such that power flow will be in a direction toward the network.

14 Claims, 9 Drawing Figures

NETWORK PROTECTOR RELAY

BACKGROUND OF THE INVENTION

A common way in which power at low voltage is furnished in locations where the load power density is high and where such power is to be relatively uninterruptable is by the use of low-voltage grid or spot networks which are supplied with power from more than one set of high-voltage feeders through voltage reducing transformers. The number of such high-voltage feeders which supply the low-voltage network will of course depend upon the magnitude of the load which is to be supplied by the network as well as the level of reliability or security desired for the network.

Such feeders supply the low-voltage network through network transformers which have their secondary or low-voltage windings connected to the low-voltage network through a three-phase circuit breaker. These circuit breakers which are controlled by network protector relays are often located in vaults in the street and it is desired that the opening and closing thereof be automatic. When, for example, it is desired to work on the high-voltage feeder and the feeder is de-energized at the sub-station, the three phase circuit breaker controlled by the network protector relay should open. When the feeder is again energized at the sub-station the circuit breaker should automatically close providing however, that the phase rotation on both sides of the circuit breaker is the same, that the phase relationship between the voltage at the output of the feeder transformer and that in the network is within the proper limits, and that the magnitude of the network transformer output voltage relative to that in the network is proper so that when the circuit breaker is closed power will flow into the network.

A network protector relay designed to open the circuit breaker when the positive-sequence power flows outwardly of the low-voltage network, as for example that which is required by the magnetizing energy of the network transformer and which will close upon proper reenergization of the feeder is shown and described in U.S. Pat. No. 3,248,609 dated Apr. 26, 1966 and assigned to the same assignee as is this application.

Under certain fault conditions in the feeder, such as for example a single line-to-ground fault, the flow of positive-sequence power will remain in a direction from the feeder to the network. Under these conditions the network protector relay described in the above identified U.S. Patent would not respond to the fault condition until after the sub-station breaker opened to deenergize the feeder and the flow of positive-sequence power is then flowed outwardly of the low-voltage network. This interval could take upwardly of eight cycles which in the case of a 60 HZ line would amount upwardly of 130 milliseconds. If the network protector relay were capable of detecting the faulted feeder, the three-phase breaker connecting the grid or spot network to the transformer could be opened in a shorter time period with less damage. If fuses were used in the primary feeder which supplies the network transformer they could blow as well as those of other primary feeder lines and, depending upon the number of primary feeders supplying the network, the result could be low-voltage network shutdown.

SUMMARY OF THE INVENTION

This invention utilizes the presence of a small amount of negative-sequence symmetrical voltage component (which has been found to occur in the network under such fault conditions) to rotate the normal 90° directional fault responding characteristics of the network protector relay so that a prompt opening of the three-phase breaker connecting the network transformer with the low-voltage network will occur in advance of any fuse blowing or serious damage to the electrical equipment.

DESCRIPTION OF THE PREFERRED EMBODIMENT

Figure 1:
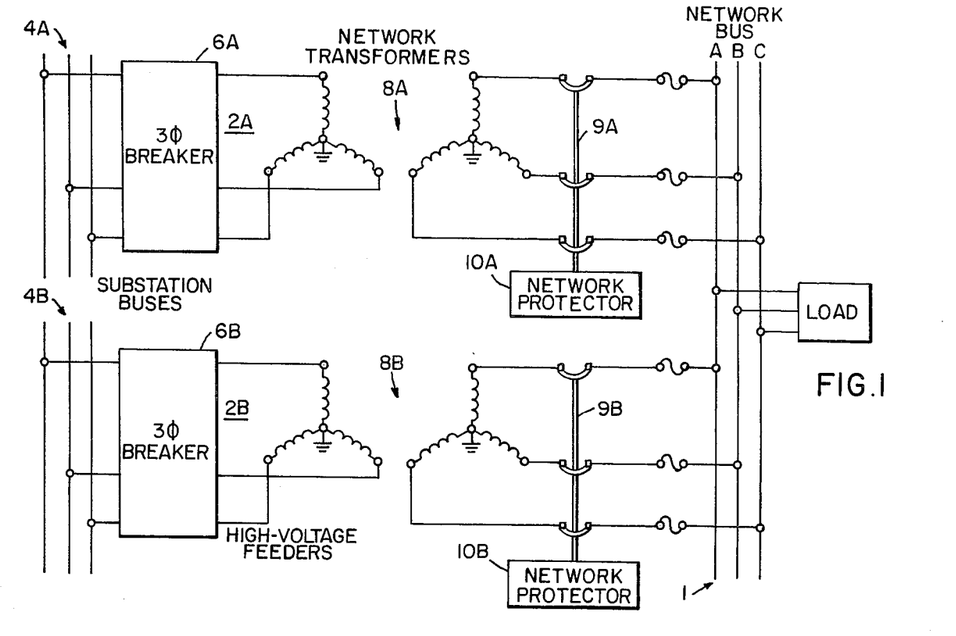
FIGS. 1 and 2 schematically illustrate typical feeder bus arrangements for energizing low-voltage networks through network transformers and three-phase circuit breakers controlled by network protector relays.

Referring to the drawings by characters of reference and more particularly FIG. 1, the numeral 1 indicates generally a low-voltage power supplying network supplied with power through a plurality of feeders 2A and 2B (only two of which are illustrated) from first and second sub-station busses 4A and 4B through the usual breakers 6A and 6B. The feeder voltage is reduced to network voltage through network step down transformers 8A and 8B and the network 1 is through the contacts of a three-phase circuit breaker 9A and 9B under control of a network protector relay 10A and 10B.

Figure 2:
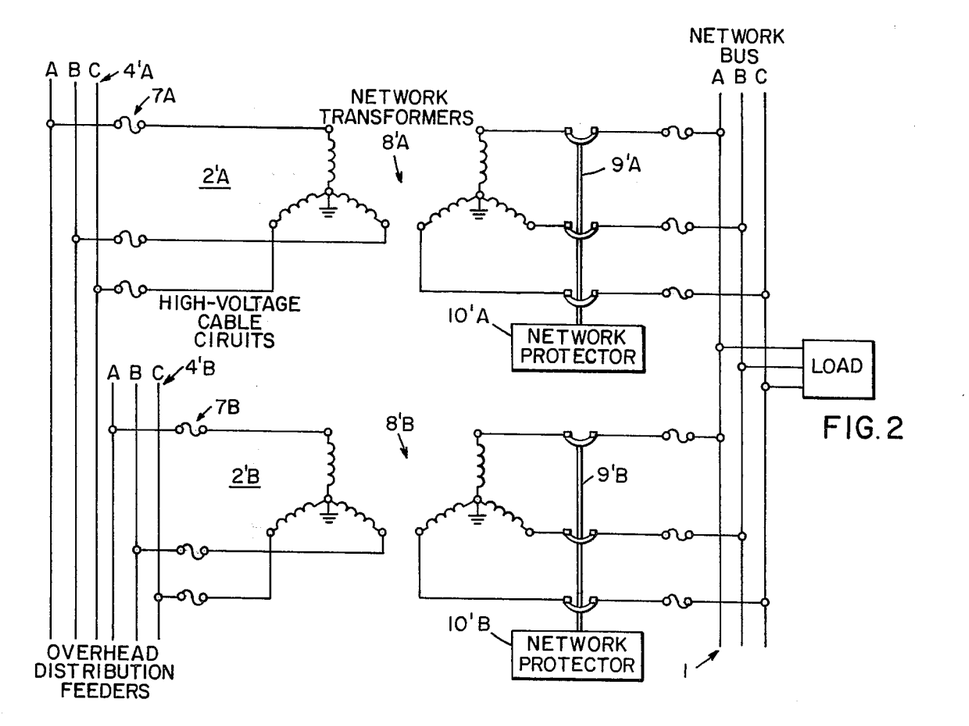

FIG. 2 shows a similar low-voltage power supplying network 1 supplied with power through high-voltage cables 2'A and 2'B from overhead distribution feeder 4'A and 4'B through fuses 7'A and 7'B, the transformers 8'A and 8'B and three-phase breaker network contacts 9'A and 9'B controlled by network protector relays 10'A and 10'B.

Figure 7A:
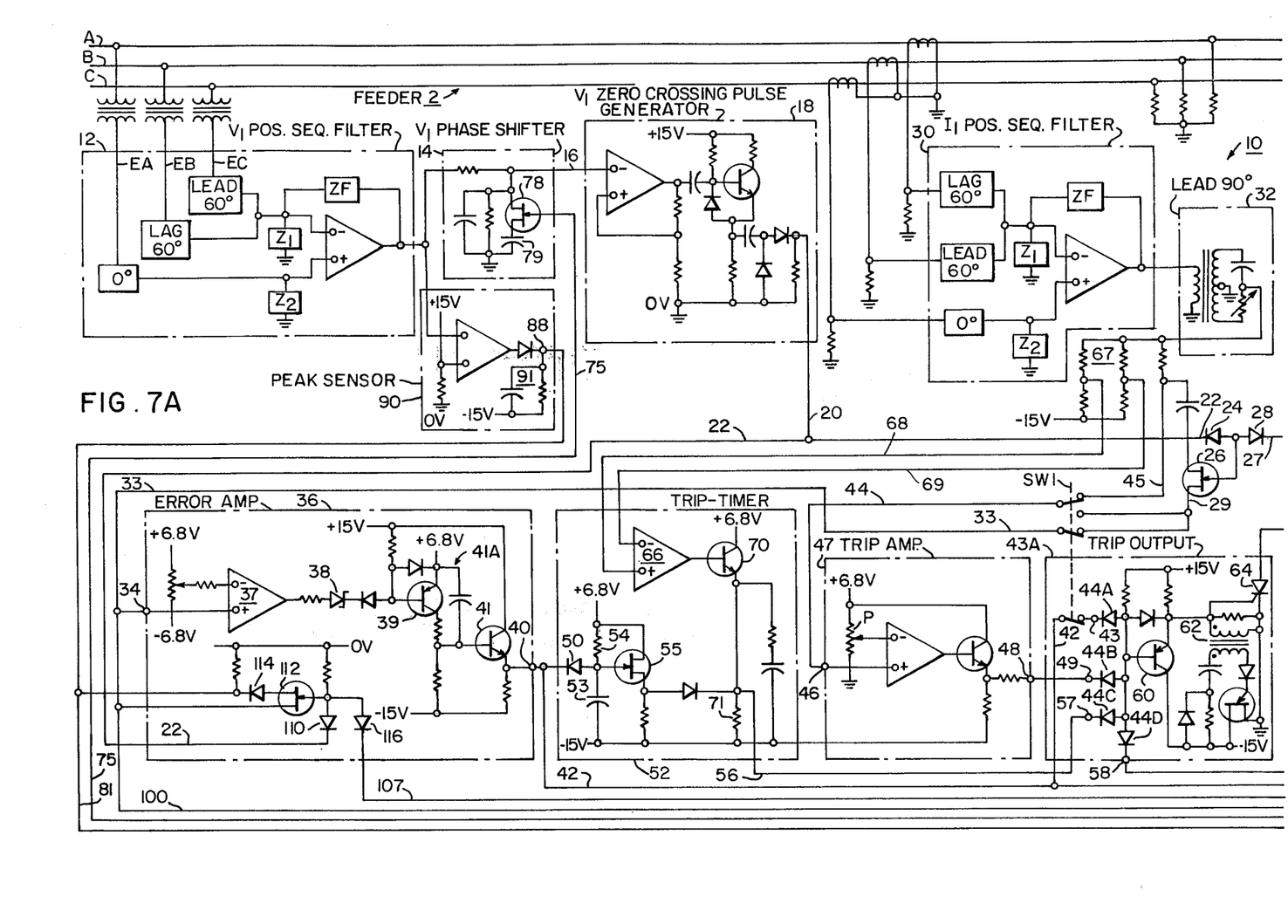
Figure 7B:
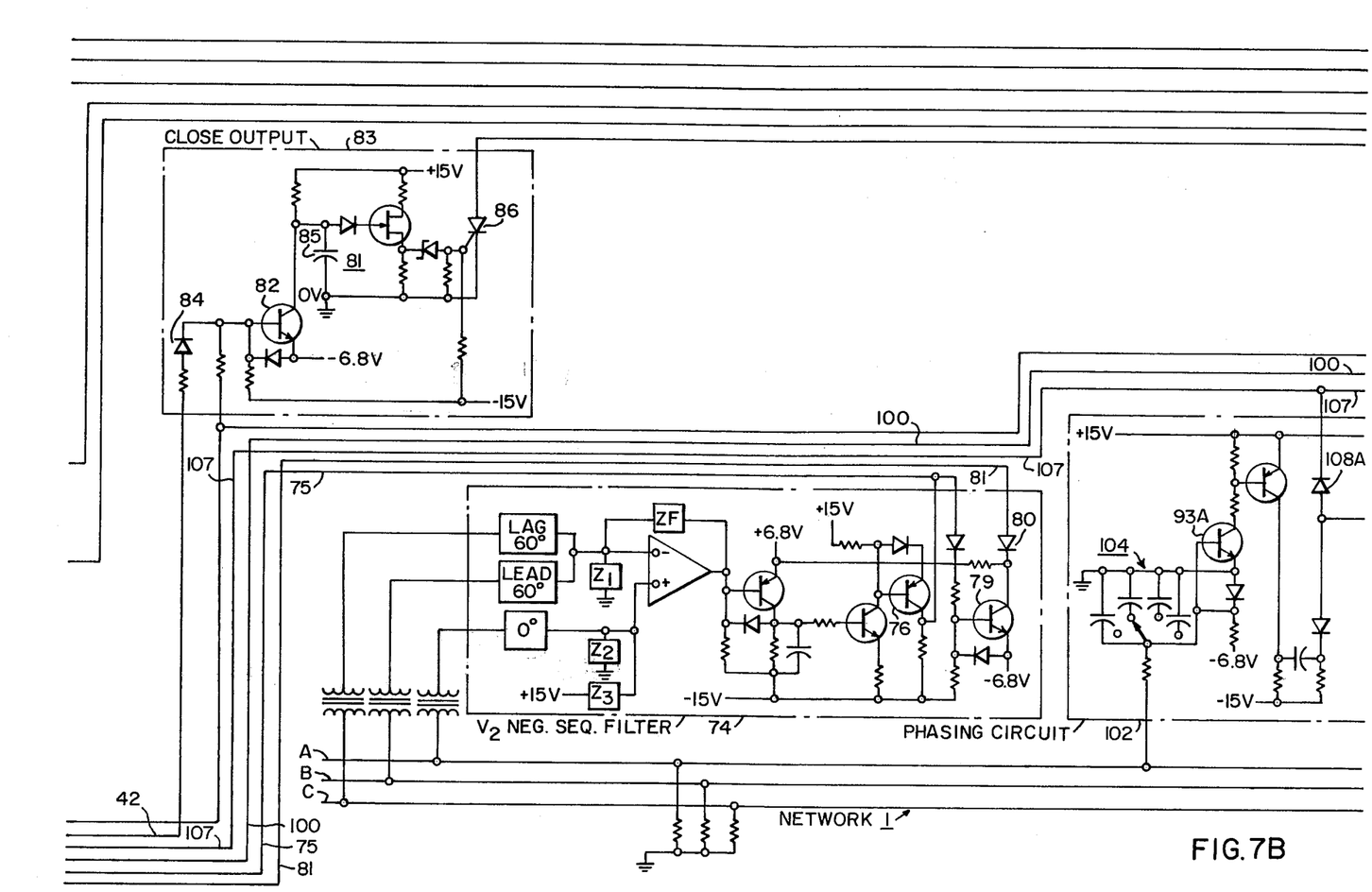
Figure 7C:
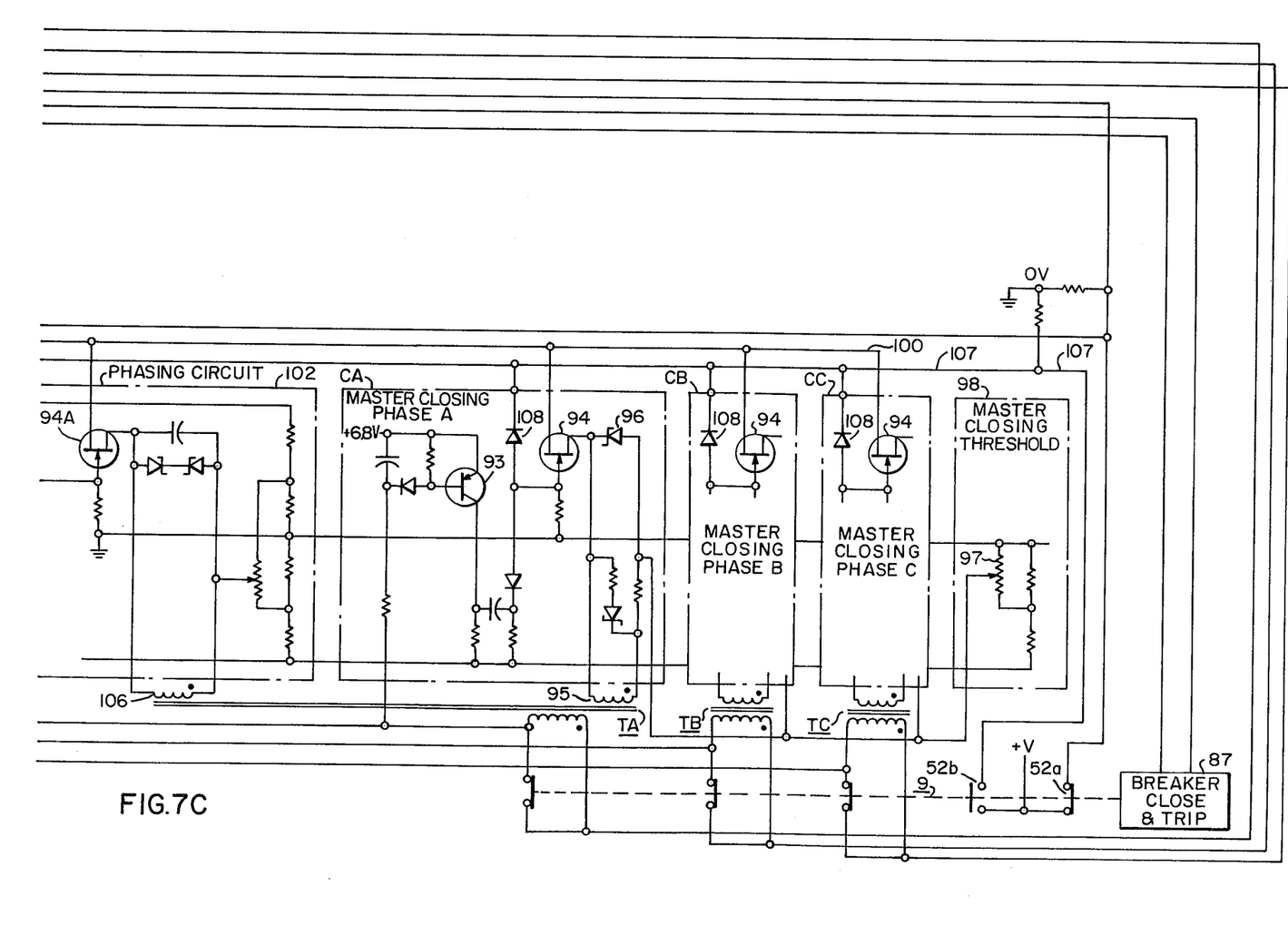

The network protector relays 10 may take the form schematically illustrated in FIG. 7 and are supplied with voltage and current quantities from the network 1 and feeder 2 as shown in FIG. 7 (not shown in FIGS. 1 and 2). The protector relay 10 includes a positive-sequence voltage component establishing means or filter 12 having input circuits EA, EB and EC supplied from the phase feeder conductors A, B and C through suitable potential transformers. The filter 12 may take any suitable form such as for example that described and claimed in a copending application Ser. No. 469,590 filed May 13, 1974 for Symmetrical Component Monitoring Device. As described therein, the filter 12 has a single-phase alternating potential output quantity which is representative of the positive-sequence voltage symmetrical component of the voltage of the feeder conductors A, B, and C.

This alternating component is supplied through a phase shifter 14 to one input terminal 16 of a zero crossing pulse generator 18 having an output terminal 20 connected to a conductor or bus 22. The transistor of the pulse generator 18 is rendered conducting at the zero degree crossing of the voltage wave supplied to the input terminal 16 and energizes the conductor 22 for a very short interval. The conductor 22 when so energized back biases the diode 24 associated with the gate device 26, which may be a field effect transistor, to cause device 26 to conduct (assuming that the network breaker is in closed position with its 52a contacts maintaining a positive potential in conductor 27 which back biases the diode 28) and energize the output conductor 29 with a quantity representing the instantaneous magnitude of the positive-sequence current component flowing in the feeder conductors A, B, and C.

This positive-sequence symmetrical current component is derived from a positive-sequence symmetrical component establishing means or filter 30 which has its input terminals IA, IB, and IC energized with a voltage quantity representative of the current flowing in the phase conductors A, B, and C respectively of feeder 2. As indicated this is obtained by means of wye connected current transformers and wye connected loading resistors RA, RB, and RC. The output quantity of the filter is connected to the field effect transistor or gate 26 through a coupling capacitor and a phase shifting network 32. With the arrangement thus recited, the conductor 29 is energized once each cycle of the positive-sequence symmetrical voltage component to determine the direction of flow of the positive-sequence symmetrical current component at the sampling instant and thereby the direction of power flow in the conductors A, B, and C.

This means of detection is more fully described and claimed in a copending application of John D. Watson, Ser. No. 433,957, filed Jan. 16, 1974 and assigned to the same assignee as is this application. In the Watson application, the sample of the positive-sequence current component is taken at the 90° point in the wave of the positive-sequence voltage component. Since a zero crossing detector is more desirable for many reasons than a maximum value detector, the sample here is taken at the 0° point and the positive-sequence current component is phase shifted ahead by 90° so the same result is obtained in a more desirable manner.

With the selector switch SW1 in the illustrated position, the conductor 29 is connected to conductor 33 and there through to the input terminal 34 of the error amplifier 36. The sampled signal is amplified by the error amplifier 37 and, if it is of at least a minimum predetermined negative value, will cause the output of the amplifier 37 to go negative and the threshold device 38, which may be a Zener diode, to conduct causing the transistors 39 and 41 to conduct. Conduction of transistor 41 provides a positive output quantity at the output terminal 40 which is connected by conductor 42 to one input terminal 43 of a trip output network 43A. The terminal 43 is one of the inputs of an AND network comprising the diodes 44A, 44B, 44C and 44D. The positive output is supplied a logical 1 signal which back biases the diode 44A. This logical 1 signal is maintained throughout a complete cycle by a one cycle memory network 41A.

The positive-sequence current component, as phase shifted by the network 32, is through conductors 44 and 45 and switch SW1 to the input terminal 46 of the trip amplitude desensitizing network 47. When the magnitude of the positive sequence current component (in a negative polarity) is above a desired predetermined minimum value, the network 47 energizes its output terminal 48 with a logical 1 quantity which is supplied to a second input terminal 49 of the AND network which back biases the diode 44B, which as will be discussed below, will supply the final logical 1 signal which trips the breaker 9.

When the error amplifier output terminal 40 became energized, it back biased the diode 50 in the trip timer 52 thereby permitting the capacitor 53 to charge at a timed rate through the resistor 54. When the capacitor 53 receives a critical change (the end of a desired delay interval), the field effect transistor 55 conducts and a logical 1 signal is supplied by the conductor 56 to the input terminal 57 to back bias the diode 44C. Under these circumstances tripping is delayed for the desired delay interval.

The fourth input terminal 58 of the AND network is connected by a branch conductor to conductor 27 which supplies a logical 1 signal thereto wherever the 52a contacts are closed. It therefore follows that with its breaker 9 closed, at magnitudes of the positive-sequence current component of negative polarity above the minimum magnitude at which the threshold devices 38 conducts and at a timed out condition of the trip timer 52, the instant that the positive-sequence component in the negative direction exceeds the magnitude required to cause the trip amplifier desensitizing circuit 47 to conduct the first logical 1 signal which is supplied to the AND network thereafter causes the transistor 60 to conduct. Conduction of transistor 60 results in the pulsatingly energization of the transformer 62 and the firing of the thyristor 64 and opening of the breaker 9.

To permit a more rapid opening of the breaker 9 at larger values of the positive-sequence current component flowing into the feeder 2, the trip timer 52 is provided with a differential amplifier 66 which is connected across a bridge network 67 energized with a quantity representative of the positive-sequence component current from the filter 30. When the magnitude of this component exceeds a predetermined minimum value, the relative potentials of the connecting conductors 68 and 69 reverses and the amplifier 66 causes the transistor 70 to conduct and energize the resistor 71. This places a logical 1 signal on the conductor 56 without the necessity of waiting for the timing out of the trip timer 52.

Figure 3:
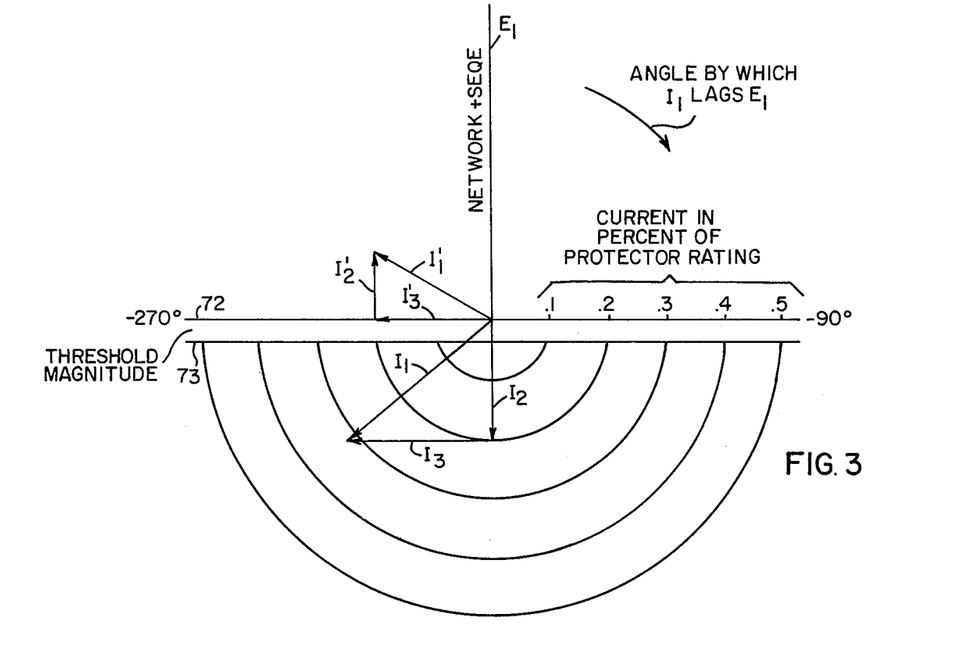
FIGS. 3 and 4 illustrate one form of the normal and rotated trip characteristics which may be used in the performance of the invention.

FIG. 3 shows the phase relationship of the positive-sequence voltage and positive-sequence current quantities which will cause the tripping or non-tripping of the network breaker 9 under the above-discussed balanced three-phase voltage conditions at the protector relay 10. In FIG. 3, the line $E_1$ represents the positive sequence symmetrical voltage component phasor as supplied by the filter 12 and the phasor $I_1$, represents the magntiude and phase of the positive-sequence symmetrical current component as supplied by the filter 30 before being phase shifted by the network 32. It should be remembered that this network 32 is provided solely for the purpose of using the zero crossing of the positive-sequence voltage component to actuate the gate 26 instead of a 90° actuation thereof so that in reality both the voltage component and the current component are utilized in a 90° leading manner with respect to the aforesaid copending Watson application.

The line 72 extends substantially prerpendicularly to the line E1 and when the current phasor $I_1$ is located above this line 72 (assuming a balanced three-phase voltage condition) positive-sequence power is flowing into the network 1 and no tripping should occur. When however the current phasor $I_1$ lags the voltage phasor $E_1$ between 90° and 270° and is of the magnitude, as illustrated, power is flowing outwardly of the network 1 and the network protector breaker 9 will trip if the magnitude of $I_1$ exceeds the setting of the trip amplifier desensitizing circuit. The calibration 0.1; 0.2; 0.3; 0.4; and 0.5 represents the locus of the tip of the phasor $I_1$ for various phase relationships of the positive-sequence current component when power is flowing outward of the network 1. The setting of the potentiometer P of the trip amplifier desensitizing circuit 47 determines which of the illustrated semicircles must be exceeded by the magnitude of the positive-sequence current phasor $I_1$ to cause tripping.

In order to insure a desired margin of reverse power flow before tripping, the operating characteristic FIG. 3 is provided with a threshold offset as represented by the perpendicular distance between the parallel lines 72 and 73. This tripping requirement is provided by the threshold device 38 of the error amplifier 36. As discussed above, the magnitude of the phasor $I_2$ representing the negative power portion of the phasor $I_1$ must exceed the distance between the lines 72 and line 73 as indicated in addition to the phasor $I_1$ extending beyond one of the semicircles for tripping to occur. The phasor $I_3$ represents the reactive portion of phasor $I_1$.

I have discovered that when certain faults occur in the feeder 2, such as for example a single line-to-ground fault, the network protector relay 10, which exhibits the illustrated characteristics of FIG. 3, will not cause the network breaker 9 to open until after the feeder breaker 6 has opened or at least one of the fuses blow. In some cases the breaker 9 may not open even after one fuse blows. As discussed above, this may take substantial time. This is because these fault conditions result in a condition in which the phasor $I_1$ will be in the second quadrant of FIG. 3 and the positive-sequence power will continue to flow into the network 1 as indicated by the phasor $I_2'$ and no tripping will occur.

When a single line-to-ground fault occurs in the feeder 2, the voltages therein as well as the voltages in the network 1 will become unbalanced. This unbalanced condition results in the presence of a negative-sequence symmetrical voltage component in the network 1 which is detected by the negative-sequence filter 74 which is supplied with voltage quantities which exist in the three-phase network 1. The filter 74, as far as its contribution to tripping is concerned could be energized from the feeder conductors, A, B, and C. As will be set out below, the negative-sequence voltage filter is used in connection with the automatic closing of the network breaker 9 to prevent its reclosing in the event of a phase rotated condition in the network 1. The negative-sequence filter 74, when energized from the network voltage, will serve to sense line-to-linie and line-to-ground faults in any feeder as well as an incorrect phase rotation in the network 1.

Figure 4:
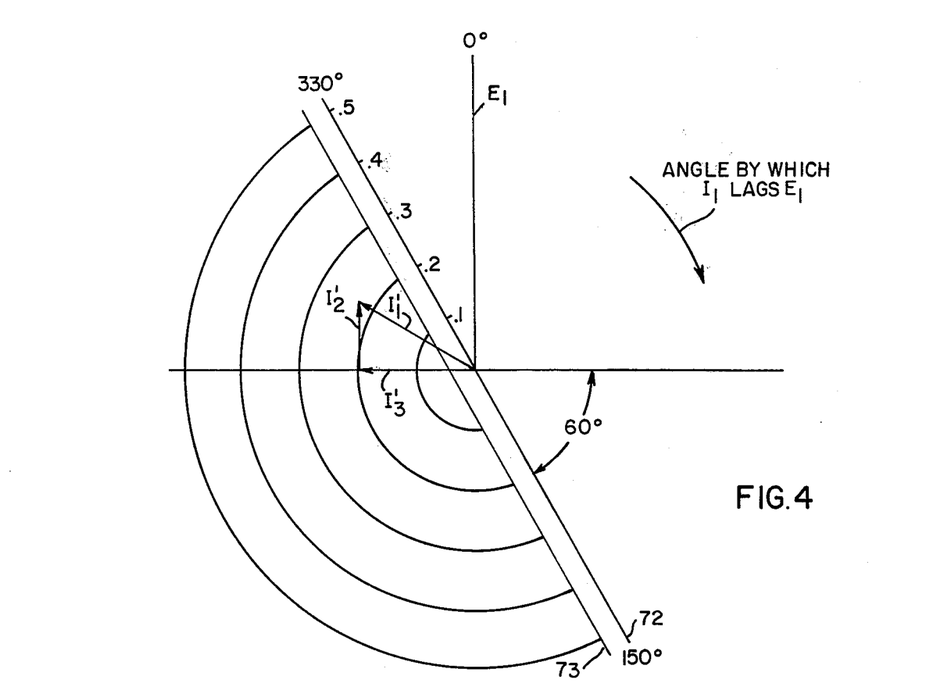

The negative-sequence voltage filter 74 is provided with an output conductor 75 the potential of which is controlled by the conductive condition of a transistor 76 which, in the absence of a negative-sequence voltage component, is non-conducting and a negative potential is supplied to the $V_1$ phase shifter 14. This holds the transistor 78 non-conducting. When, however, a negative-sequence voltage component appears as for example a quantity which is equal to or exceeds 6percent of the peak value of the network voltage, the transistor 76 conducts to place a positive potential on the conductor 75. This renders the field effect transistor 78 conducting to add a capacitor 79 in the shifter network 14 which delays the rendering of the gate 26 conducting at a time interval beyond the 90°measuring point, for example by 60° to the 150° point. The effect is to lag the angle of the lines 72 and 73 by this additional angle, as illustrated in FIG. 4. As will be apparent from FIG. 4, when this occurs the phasors $I_1'$ and $I_2'$ both lie in the tripping range and the network protector relay 10 will trip the network breaker 9 without the necessity of either the fuses 7 blowing or the breaker 6 opening. This temporary shifting of the network protector characteristics will eliminate tripping when the phasor $I_1$ lags the voltage $E_1$ by less than 150° and more than 90° as might possibly occur and upon which the occurrence of which tripping might be desired. Since the rotation of the characteristics occurs only when there is a feeder fault and tripping is in progress this is immaterial.

Figure 5:
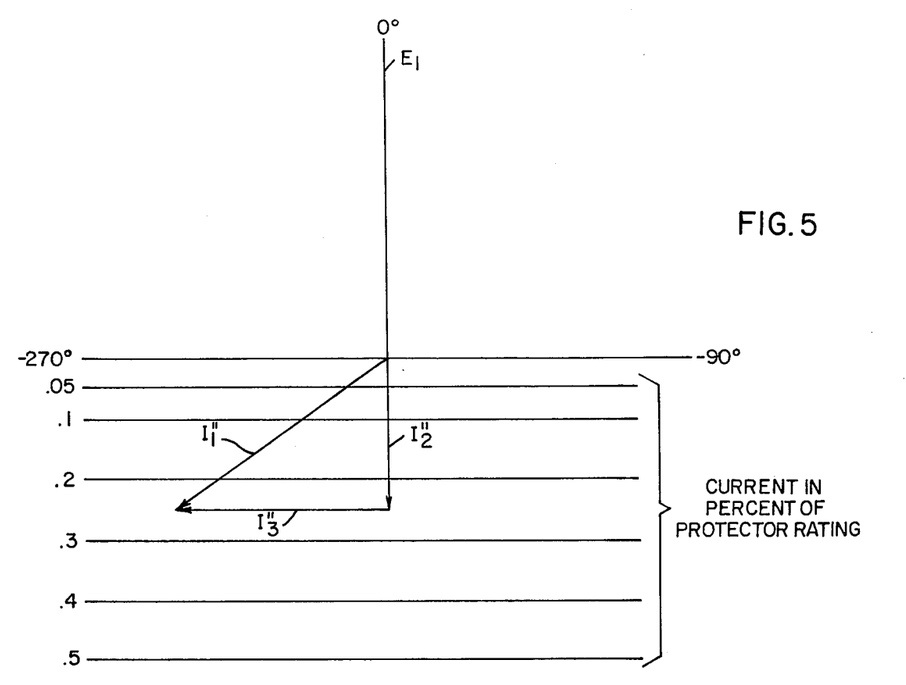
FIGS. 5 and 6 illustrate a second form of the normal and rotated trip characteristics which may be used in the performance of the invention; and, FIGS. 7A, 7B and 7C together schematically illustrate a network protector relay embodying the invention.

When the selector switch SW1 is in its other position, the conductor 33 is disconnected from the conductor 29 and the conductor 44 is disconnected from the conductor 43 and reconnected to the conductor 29 so that the sampled quantity $I_2''$ is supplied to the trip amplifier 47 and (since the switch SW1 has now disconnected the AND network input terminal 43 an effective logical 1 signal is continually applied) tripping is dependent upon the magnitude and phase of phasor $I_1''$ which is similar to the characteristics as shown in FIG. 3 except that the elimination of the threshold determination results in the straight line characteristic shown in FIG. 5 rather than the semi-circular characteristics of FIG. 3.

Figure 6:
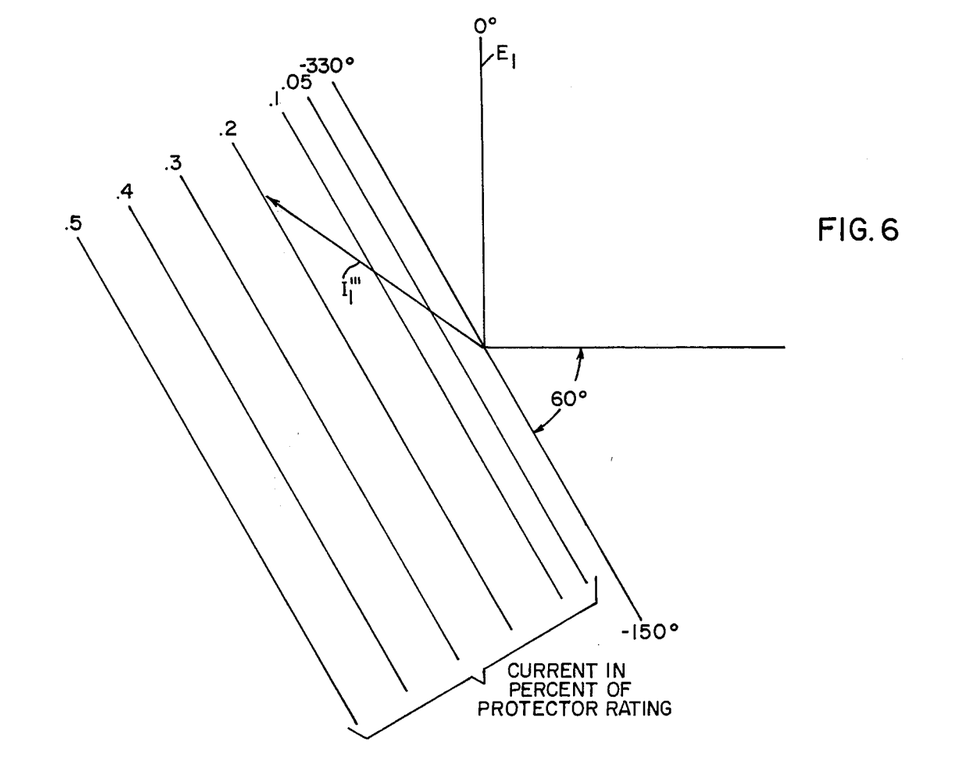

FIG. 6 shows the lagging characteristic situation when negative-sequence voltage appears in the work 1. The lag is attained as described above in connection with FIG. 4 and need not be repeated. $I_1'''$ represents a possible positive-sequence current characteristic which might exist with a line-to-ground fault on one of the feeders 2.

Automatic closing of the network breaker 9 should occur at all times when the feeder 2 is properly energized with respect to the network 1, unless the network 1 contains a negative-sequence voltage component. As explained above, the presence of the negative-sequence voltage component renders the transistor 76 of the $V_2$ negative-sequence voltage filter 74 conducting. When transistor 76 conducts it causes transistor 79 to conduct and connect the cathode of diode 80 to a −6.8 volt terminal. This results in the conductor 81 being maintained sufficiently negative to cause conduction of transistor 39 of the error amplifier 36 and energization of the one cycle memory 41A to hold transistor 41 conducting to maintain a positive potential at output terminal 40 of the error amplifier 36. The conductor 42 is also connected to the base electrode of a transistor 82 of a close output network 83 through a diode 84 so that the rendering of the conductor 42 positive renders the transistor 82 conducting to prevent the charging of capacitor 85 which is necessary to cause the thyristor 86 to conduct with the resulting energization of the breaker close and trip device 87.

The conductor 81 is also connected to the output terminal 88 of a peak sensor 90. This sensor 90 is energized from the positive-sequence voltage filter 12.

When the peak value of the positive-sequence voltage component of filter 12 is of less than a desired magnitude, the amplifier thereof does not energize the one cycle memory network 91 thereof and the terminal 88 will be held at a negative potential and again resulting in the energization of the one cycle memory 41A of the error amplifier 36 and the inability of the close output 83 to close the breaker 9.

Transformers TA, TB and TC have their primary windings connected across the breaker contacts by which the A, B, and C phases of the network 1 are connected to the feeder 2. These transformers TA, TB, and TC have a first secondary winding individually energizing master closing circuits CA, CB, and CC associated with the phases A, B, and C respectively (the details of the CA network only being shown). The voltage signals supplied to the networks are phased as shown by the normal "dot" nomenclature. The transistor 93 of network CA is arranged to conduct near but preferably just ahead of the 270° point of the A phase network voltage. When transistor 93 conducts a momentary conducting pulse is placed on the field effect transistor 94. At the near 270° point, the dot end of the secondary winding 95 of transformer TA will be negative and the Zener diode 96 will establish a positive voltage which overcomes the negative bias provided by the potentiometer 97 of the master closing threshold network 98. If the phasing is not as desired when transistor 94 conducts the branch conductor 100 of conductor 33 will go negative thereby causing the error amplifier 36 to provide a positive potential signal to the close output 83 and prevent closure of the network breaker 9 as described. The same function is provided by the master closing network CB and CC to measure the phase relationships of the B and C phases.

The phasing circuit 102 is similar to the master closing circuits CA, CB, and CC except that the base electrode of the transistor 93A is connected by one of the capacitors of the associated capacitor bank 104 as determined by the selector switch to cause the field effect transistor 94A to momentarily turn on at the desired point in the voltage wave. If the phasing as determined by the secondary winding 106 of the transformer TA is incorrect the branch conductor 100 will be made negative to prevent closing as described above.

The branch conductor 100 is continaully connected to the input terminal 34 of error amplifier 36 and whenever it is negative will provide positive output potential or signal at its output terminal 40. If the breaker 9 is closed this is provided from the positive-sequence current component filter 30 under control of the gate 26 since the closure of contacts 52a provide the necessary reverse biasing to the diode 28 of the gate 26 and diode 44D and tripping may occur if the other inputs to the AND network of the trip output network 43A become satisfied. If the breaker is open, the reverse bias on the diodes 28 and 44D is removed and the gate 26 can no longer open to permit energization of the conductor 29 from the filter 30 or to block transistor 60 which is necessary for tripping because of the open contacts 52a.

With the breaker 9 open, its 52b contacts are closed and a positive potential is placed on a conductor 107 which reverse biases the diodes 108 of the master closing networks CA, CB, and CC thereby permitting the transistors 94 to conduct under control of the transistors 93. This positive potential condition of the conductor also reverse biases diode 108A to permit transistor 94A to conduct under control of the transistor 93A. The conductor 107 is also connected to the cathode of a diode 110, the anode of which is connected to the control electrode of a field effect transistor 112 which, at selected intervals, connects the conductors 100 and 81 through a diode 114. The conductor 22 leading from the zero crossing generator is also connected to the control electrode of the transistor 112 through a diode 116. With the breaker 9 open and 52b contacts closed, the transistor 112 will conduct at each zero degree crossing of the positive-sequence voltage filter 12. If at this time the memory network 91 is charged and there is no negative-sequence voltage component output of the filter 74 (transistor 79 is not conducting) and all of the master closing networks CA, CB, and CC and phasing circuit 102 are satisfied, the error amplifier 36 will detect no error and a negative output potential at its output terminal 40 will permit blocking of the transistor 82 of the close output 83. The capacitor 85 then charges at a timed rate to a critical charge and caue the thyristor 86 to conduct and close the network breaker 9.

What is claimed and is desired to be secured by United States Letters Patent is as follows:

1. A network protector relay for controlling the connection between a polyphase feeder bus and a polyphase network bus, said protector relay comprising a first circuit means having a polyphase input adapted to be connected to said connection for energization by the current and voltage components of the power flowing in said connection, said means including elements which determine the magnitude of one of said components with respect to the other of said components at first and second time intervals in the wave of said other component, selecting means selecting which one of said time intervals is operative, said first circuit means having an output energized in accordance with the magnitude of said one component, a second circuit means having a polyphase input adapted to be connected to said network bus for energization by at least one of said voltage and current components of said network bus and having an output, said second circuit means including a fault detector energized by said one component of said network bus and effective to provide said output of said second circuit means with an output signal in response to a fault responsive condition of said one component of said network bus of at least a predetermined magnitude, means connecting said output of said second circuit means to said selecting means of said first circuit means, said selecting means being effective in the absence of said output signal to select said first time interval and effective in the presence of said output signal to select said second time interval, and disconnect control means connected to said output of said first circuit means, said disconnect control means being effective to interrupt the connection between said feeder bus and said network bus solely when said magnitude of said one component as established by said elements is greater than a predetermined desired magnitude.

2. The protector relay of claim 1 in which said one component of said power components is said current component and said other power component is said voltage component.

3. The protector relay of claim 2 in which said elements of said first circuit means are symmetrical component monitoring devices, one of said devices having an output wave representing the positive-sequence symmetrical voltage component of said voltage in said connection, the other of said devices having an output wave representing the positive-sequence symmetrical current component of said current in said connection.

4. The protector relay of claim 1 in which said first circuit means includes a second output energized by a quantity which is a function of the magnitude of said one power component, said second output being connected to said disconnect control means, said disconnect control means being effective to interrupt the connection between said feeder bus and said network when the magnitude of said quantity and said one power component as established by said elements are both greater than predetermined desired magnitudes.

5. The network relay of claim 4 in which said first time interval is substantially at the 90° point in the wave of said other power component and said second time interval is at a point later in the wave of said other power component.

6. The network relay of claim 5 in which said second time interval is substantially at the 30° point in the wave of said other power component.

7. The network relay of claim 6 in which said one power component is proportional to the magnitude of said current component of said power and said other power component is said voltage component of said power.

8. A network protector relay comprising a positive-sequence symmetrical voltage component establishing means and a positive-sequence symmetrical current component establishing means, circuit means energizing said symmetrical voltage component means and said symmetrical current component means with voltage and current quantities from a polyphase network, a negative-sequence symmetrical voltage component establishing means energized from a polyphase network, a disconnect control means having a first input and an output, a gating device having a main path and a control gate controlling the conductivity of said main path, first circuit means connecting said disconnect control means to said positive-sequence current component establishing means including said main path of said gating device, second circuit means connecting said positive-sequence symmetrical voltage component means to said control gate and including selecting means to render said control gate effective to open said main path solely at a first or a second selected time interval in the wave of said positive-sequence voltage component whereby said input of said disconnecting means is energized with a first control quantity having a magnitude proportioned to the magnitude of said positive-sequence current component existing at the selected one of said time intervals, third circuit means connecting said negative-sequence voltage component means to said selecting means, said selecting means being effective to select said first time interval in the absence of a control signal from said negative-sequence voltage component means, said negative-sequence voltage component means being effective to establish its said control signal when the magnitude of said negative-sequence voltage component exceeds a predetermined value, said protector relay further including magnitude sensing means sensing the magnitude of said positive-sequence current component and effective to cause said disconnect control means to provide a tripping signal at its said output solely when the magnitude of said positive-sequence current component passed by said gating device is above a predetermined minimum value.

9. The protector relay of claim 8 in which said second time interval is a time interval in the voltage wave of said positive-sequence symmetrical voltage component later than said first time interval.

10. The protector relay of claim 9 in which said first time interval is substantially at the maximum magnitude point in the voltage wave of said positive-sequence symmetrical component.

11. The protector relay of claim 10 in which said second time interval lags said first time interval by substantially 60°.

12. The protector relay of claim 11 in which includes an AND network having a plurality of inputs and an output connected to said input of said control means, said first circuit means including a first of said inputs of said AND network, a fourth circuit means connecting said positive-sequence current component establishing means to a second of said inputs of said AND network, said first circuit means including said magnitude sensing means to prevent the energization of said first input of said AND network unless the magnitude of said poitive-sequence current component passed by said main path of said gating device exceeds a predetermined magnitude.

13. The protector relay of claim 12 in which said fourth circuit means includes a second magnitude sensing means, said fourth circuit means being effective to actuate said second input of said AND network solely when the magnitude of said positive-sequence current component is above a predetermined minimum value.

14. The protector relay of claim 8 in which said selecting means effective to phase shift said positive-sequence symmetrical voltage component, said selecting means being effective at the zero crossing of the phase shifted positive-sequence voltage component in at least the direction of a change of potential polarity in a first direction, and in which said positive-sequence symmetrical current component establishing means provides a current component output which leads the positive-sequence voltage component by 90°.

* * * * *